US006532491B1

United States Patent
Lakis et al.

(10) Patent No.: US 6,532,491 B1
(45) Date of Patent: *Mar. 11, 2003

(54) PROCESSES AND APPARATUSES FOR MANAGING NETWORK DEVICES

(75) Inventors: David M. Lakis, Orem, UT (US); William A. Cluff, Orem, UT (US); Mark D. Webster, Provo, UT (US); Jay R. Cummings, Provo, UT (US)

(73) Assignee: Novell, Inc., Provo, UT (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/964,535

(22) Filed: Nov. 5, 1997

Related U.S. Application Data

(63) Continuation of application No. 08/824,642, filed on Mar. 24, 1997.

(51) Int. Cl.[7] .............................................. G06F 15/173
(52) U.S. Cl. ........................ 709/223; 709/224; 709/226
(58) Field of Search ........................ 395/200.53, 200.3, 395/651, 653, 615, 200.09; 709/223, 202, 205, 224, 226; 707/104

(56) References Cited

U.S. PATENT DOCUMENTS

| 5,291,583 A | 3/1994 | Bapat .......................... 395/705 |
| 5,317,568 A | 5/1994 | Bixby et al. ................. 370/401 |
| 5,317,742 A | 5/1994 | Bapat .......................... 709/300 |
| 5,331,642 A | 7/1994 | Valley et al. ................ 714/705 |
| 5,471,617 A | 11/1995 | Farrand et al. ............. 709/100 |
| 5,473,608 A | 12/1995 | Gagne et al. ................ 370/401 |
| 5,491,694 A | 2/1996 | Oliver et al. ................ 370/455 |
| 5,491,796 A * | 2/1996 | Wanderer et al. ....... 395/200.09 |
| 5,509,123 A | 4/1996 | Dobbins et al. ............. 709/243 |
| 5,517,622 A | 5/1996 | Ivanoff et al. ............... 709/232 |
| 5,522,042 A | 5/1996 | Fee et al. .................... 709/226 |
| 5,541,911 A | 7/1996 | Nilakantan et al. ......... 370/422 |
| 5,548,796 A | 8/1996 | Ketchum ...................... 710/52 |
| 5,559,958 A | 9/1996 | Farrand et al. ............... 714/27 |
| 5,561,769 A | 10/1996 | Kumar et al. ............... 709/202 |

(List continued on next page.)

OTHER PUBLICATIONS

Konopka et al., A Multilayer–Architecture for SNMP –Based, Distributed and Hierarchical Management of Local Area Networks, IEEE 1995, pp. 272–279, Jul. 1995.*
World Wide Web, SNMP Finds A New Home In Electronic Messaging Systems, Alex Cullen, Sep. 11, 1995.
IBM Research Report, Implementing OSI Agents for TMN, M. Feridun et al., Nov. 13, 1995.
University of Washington, Dept. of Computer Science and Engineering. A Study on Internet Management: SNMP and Internet MIB, Sai Lun Li, 1990.

Primary Examiner—Glenton B. Burgess
Assistant Examiner—Bradley Edelman
(74) Attorney, Agent, or Firm—Dinsmore & Shohl LLP

(57) ABSTRACT

Processes and apparatuses are provided for managing one of a plurality of network manageable devices, each one of the plurality of network manageable devices having a unit of first management information associated therewith. A request is issued to a first computer from a second computer to access the unit of first management information associated with the one of the plurality of network manageable devices. A first data structure is created for storing a unit of first device information for each one of the plurality of network manageable devices with each unit of first device information identifying its respective network manageable device. The first data structure is searched for a unit of first device information associated with the one of the plurality of network manageable devices and the unit of first device information associated with the one of the plurality of network manageable devices is used to locate the unit of first management information associated with the one of the plurality of network manageable devices.

7 Claims, 12 Drawing Sheets

U.S. PATENT DOCUMENTS

| | | | |
|---|---|---|---|
| 5,566,160 A | | 10/1996 | Lo .............................. 370/246 |
| 5,572,195 A | | 11/1996 | Heller et al. ........... 340/825.35 |
| 5,580,177 A | * | 12/1996 | Gase et al. .................... 400/61 |
| 5,581,478 A | * | 12/1996 | Cruse et al. ................ 364/505 |
| 5,586,304 A | | 12/1996 | Stupek, Jr. et al. ......... 395/712 |
| 5,588,143 A | | 12/1996 | Stupek, Jr. et al. ..... 395/500.41 |
| 5,684,988 A | * | 11/1997 | Pitchaikani et al. ........ 395/615 |
| 5,699,495 A | * | 12/1997 | Snipp ........................ 358/1.15 |
| 5,706,508 A | * | 1/1998 | Chen et al. ................. 395/616 |
| 5,742,762 A | * | 4/1998 | Scholl et al. ............ 395/200.3 |
| 5,745,897 A | * | 4/1998 | Perkins et al. .............. 707/101 |
| 5,778,183 A | * | 7/1998 | Filion et al. ........... 395/200.53 |
| 5,822,569 A | * | 10/1998 | McPartlan et al. .......... 395/500 |
| 5,864,865 A | * | 1/1999 | Lakis ......................... 707/103 |
| 5,913,037 A | * | 6/1999 | Spofford et al. ............ 709/226 |
| 5,987,514 A | * | 11/1999 | Rangarajan ................. 709/224 |
| 6,003,077 A | * | 12/1999 | Bawden et al. ............. 709/223 |

OTHER PUBLICATIONS

Stanford University, Dept. of Computer Science, Real–time Database Experiences in Network Management Application, Yoshiaki Kiriha, Sep. 1995.

IBM Research Report, EMOSY: An SNMP Protocol Object Generator for the Protocol Independent MIB, Shyhtsun F. Wu, Nov. 5, 1992.

IEEE Globecom 1994, A Distributed Network Management System, Kwang–Hui Lee, pp. 548–552.

Integrated Network Management, II, OSI Management Information Base Implementation, Subodh Bapat, 1991, pp. 817–832.

IEEE Singapore International Conference on Networks, A Model for SNMP Based Performance Management Services, Apostolopoulos et al., Jul. 199, pp. 269–273.

IBM Research Report, Surfin Network Resources across the Web, Luca Deri, Feb. 5, 1996.

Singapore ICCS '94, A Generic Manager/Agent Architecture for TMN Applications, J.T. Park et al., Nov., 1994.

Integrated Network Management II, A multi–agent system for network management, Rahali et al., 1991, pp. 469–479.

Integrated Network Management II, SNMP for non–TCP/IP sub–networks: an implementation, Duato et al., 1991, pp. 201–212.

Integrated Network Management II, Design of the Mandate MIB, Haritsa et al., 1993, pp. 85–96.

Integrated Network Management II, MIB Design for Network Management Transaction Processing, Shoichiro Nakai, 1993, pp. 97–108.

IEEE Communications Magazine, The OSI Model, The OSI Network Management Model, Yechiam Yemini, May, 1993, pp. 298–307.

IEEE Globecom 1993, A Protocol Architecture for Integrated Management of Local and Large Networks, Michel Colin et al., pp. 1548–1552.

IBM Research Report, On Implementing a Protocol Independent MIB, Shyhtsun F. Wu, Aug. 13, 1992.

World Wide Web, X.500 Directory Monitoring MIB, Jun., 1996.

IEEE Milcom 1995, Remote Control of Diverse Network Elements Using SNMP, Aicklen et al., 1995, pp. 673–677.

IEEE Singapore International Conference on Networks/ International Conference on Information Engineering 1995, Design and Implementation of a Security Management System, Song et al., Jul., 1995, pp. 261–264.

IEEE Globecom 1993, Network Management Information for System Control, Leon et al., pp. 1553–1557.

IEEE Globecom 1990, Network Management with Consistently Managed Objects, Wu, et al., pp. 0182–1087.

IEEE Globecom 1993, Design and Implementation of a Configuration Management System, Kwang–Hui Lee, pp. 1563–1567.

IEEE Globecom 1995, Design and Implementation of TDX–10 Management System Incorporating TMN Concept, Park et al., pp. 1845–1849.

Banyan Corp., SNMP Server Agent, date unknown.

Worldtalk Corporation, The NetJunction SNMP Manager and Agent, date unknown.

ISOCOR Solutions, Directory Services Products, date unknown.

IEEE Globecom 1991, An Automatic Generation of Management Information Base (MIB) for OSI based Network Management System, Kiriha, et al., 1991.

* cited by examiner

RFC1759.H 107A

```
#define prtInputDefaultIndex_ATTRIBUTE           6
#define prtInputIndex_ATTRIBUTE                  1    109
#define prtInputType_ATTRIBUTE                   2
#define prtInputDimUnit_ATTRIBUTE                3
#define prtInputMediaDimFeedDirDeclared_ATTRIBUT  4
#define prtInputMediaDimXFeedDirDeclared_ATTRIBUTE 5
```

RFC1759.C 108A

130 →
```
/* ---------------------
 * Abstract Object: Input Entry
 * ---------------------
 */
```

117A → `AttrInfo Input_Entry_AttrInfo[] = {`

111A → `{    prtInputIndex_ATTRIBUTE,`          /* Object Identifier */
      `     AIT_INTEGER}`                       /* Type Integer */
111B → `{    prtInputType_ATTRIBUTE,`           /* Object Identifier */
      `     AIT_INTEGER}}`                      /* Type Integer */

110A →
```
static ObjInfo Input_Entry_ObjInfo = {
    &OCB_Input_Entry,        /* Obj Control Block Pointer */
    Input_Entry_AttrInfo     /* pointer to attributes */
}
```

INPUT.C 113A

112A →
```
ObjControl OCB_Input_Entry ={
OCBF_NONE,    /* no flags */
NULL,
inTableGet,
inTableGetNext,
NULL,
NULL,
NULL
};
```

FIG. 9

PROCESSES AND APPARATUSES FOR MANAGING NETWORK DEVICES

This application is a continuation of copending U.S. application Ser. No. 08/824,642, filed Mar. 24, 1997.

TECHNICAL FIELD OF THE INVENTION

This invention relates generally to the field of processes and apparatuses for managing at least one network manageable device, and, more particularly, to processes and apparatuses for managing a plurality of printer devices by utilizing a proxy agent.

BACKGROUND OF THE INVENTION

The Internet community has promulgated communication protocols and a network information structure to facilitate standardization of computer network management. The Common Management Information Protocol (CMIP) and the Simple Network Management Protocol (SNMP) have both been developed to implement the task of network management. SNMP provides a means for a network administrator to manage entities and devices on a computer network, including the monitoring of network performance and status; controlling network operational parameters; and reporting, analyzing, and isolating faults. This network management is accomplished by transmitting information via one of three SNMP operations: GET, GETNEXT, and SET. The GET operation retrieves a value associated with an item of network information while the GETNEXT operation retrieves the value of a next item of network information. The SET operation changes the value of one or more items of network information. These SNMP requests for management information are typically issued by a management computer to an agent application located somewhere on the computer network. As used herein, the phrase "management information" is intended to refer to any unit (i.e., value) of information which would be useful in managing or administering a computer network. This can include static and dynamic information as well as information which is read only or read/write. The agent application receives the request and accesses the appropriate network information and sends a response back to the management computer. Typically, a computer network has a plurality of agents, each of which accesses the management information associated with a unique network device.

As illustrated in FIG. 1, the Internet community has also created a hierarchial structure or tree 20 for standardizing the information associated network resources which can be accessed using SNMP-type protocols. A network resource can represent a computer, a printer device, a program, or a variable. Each network resource has a unique OBJECT IDENTIFIER which is a series of dotted decimal notations specifying an item's location in the tree. For example, an enterprise item 22 has been defined which appears under a private item 24, the OBJECT IDENTIFIER for the enterprise item being "1 (iso) .3 (org) .6 (dod) .1 (internet) .4 (private) .1 (enterprise)". Thus, each OBJECT IDENTIFIER comprises a series of sub-OBJECT IDENTIFIERS which are separated by periods. The Internet community has also defined, using Abstract Syntax Notation one (ASN.1), a Management Information Base-II (MIB) item 26 which has an OBJECT IDENTIFIER of 1.3.6.1.2.1. The MIB-2 item 26 defines a database comprising specific information about managed devices. A management application is used to request MIB-defined information about a managed device via a protocol such as CMIP or SNMP. For example, a printer MIB item 28 located below the MIB-2 item 26 has been defined in the document Request For Comments (RFC) 1759. The printer MIB item 28 contains numerous MIB items thereunder, each MIB item defining a unit of management information which is useful in the management of a printer and having its own OBJECT IDENTIFIER. As used herein, the generic phrase "MIB item" is intended to refer to an location under the MIB-2 item 26 in the tree 20 which has a unique OBJECT IDENTIFIER associated therewith. Thus, the printer MIB item 28, the host resources MIB item 37, the input group item 30, the input entry item 38, and the input index item 39 are all examples of MIB items. For clarity of later discussion, the printer MIB item 28 will now be discussed in greater detail by way of example.

RFC 1759 classifies printer information into three general categories: descriptions, status, and alerts. Descriptions convey information about the configuration and capabilities of the printer and its various sub-units while status information relates to the operating state of the same. An alert is a representation of a reportable event in the printer, which are further classified as critical and non-critical. Examples of critical alerts can include "toner empty" and "output bin full" while non-critical alerts can include "toner low" and "output bin nearly full".

The RFC 1759 associated with the printer MIB item 28 further defines an abstract model of a printer for logically organizing information within the printer MIB item 28. The printer model is described as comprising 13 sub-units each of which are associated with a specific physical sub-device of a printer or a logical process performed thereat. The 13 sub-units include: a general printer sub-unit, an input sub-unit, a media sub-unit, an output sub-unit, a finisher sub-unit, a marker sub-unit, a media path sub-unit, a system control sub-unit, an interface sub-unit, a channel sub-unit, an interpreter sub-unit, a console sub-unit, and an alert sub-unit.

By way of example, the input sub-unit and its relationship to the printer MIB item 28 will now be discussed. An input sub-unit is a printer mechanism which feeds media (i.e., the substance, such as paper, on which marking is to be done) into the printer. Thus, a printer can contain one or more input sub-units corresponding to such devices as fixed input bins or removable trays. The input sub-units are managed as a tabular, indexed collection of possible devices which are defined by an input group item 30 of the printer MIB item 28, as shown in FIG. 2. Each printer input sub-unit (e.g., such as a specific manual feed tray) preferably has information associated therewith according to each of the entries or MIB items which are defined under the input entry item 38, three exemplary entries being illustrated in FIG. 2 as an input index item 39, an input type item 40, and an input dimension unit item 41. The printer MIB item 28 also defines 12 other group items which generally correspond to each of the sub-units of the printer model. For example, the general group item 32 and the output group item 34, along with the OBJECT IDENTIFIER for each, are also illustrated in FIG. 2. The input group item 30 of the printer MIB item 28 is organized primarily by a table comprising 23 entries, each of which is a separate MIB item located under the input entry item 38. Some of these table entries or MIB items are mandatory (i.e., define information which must be supported by a printer device) and others are optional.

So as to effectively organize and reference the MIB items under the input entry item 38, the input entry item 38 defines two indexes for locating MIB information or values thereunder. The first index, or device index, is associated with or identifies a unique printer device. This index is defined by a Host Resources MIB item 37 (FIG. 1) as hrDeviceIndex. The second index, or associated index, defined by the input entry item 38 is the input index which appears as a separate MIB item under the input entry item 38, as illustrated at 39 of FIG. 2. The value of this index identifies unique input sub-units of a printer device. Further, this input index value defines a unique row of the input table and can be used to locate values for each of the other MIB items under the input entry item 38 (each of these MIB items forming a column of the input table). In other words, each input sub-unit of a specific printer device will have an input index value, an input type value, an input dimension unit value, and so on. While the above-described two index system has been illustrated herein with respect to the input entry item 38 for ease of discussion, other printer MIB groups incorporate similar indexing mechanisms for describing the printer MIB items thereunder.

While printer device vendors have begun providing capabilities within their printers to permit access to the units of management information defined by the RFC 1759 printer MIB, management of multiple printer devices is still often complex, inefficient, and time consuming because each of these printer devices must be individually queried from a management computer to access these units of management information. For example, if the administrator of a network is interested in simultaneously assessing the status of a plurality of printer devices on a computer network, a plurality of SNMP requests must be issued to the multiple agents which are responsible for each printer device. As such, there is a desire to provide improved processes and apparatuses for accessing management information associated with a plurality of network manageable devices by using a single proxy agent to retrieve the desired management information.

SUMMARY OF THE INVENTION

Accordingly, it is an object of the present invention to obviate the above-described problems and shortcomings by providing processes and apparatuses for quickly and efficiently accessing management information associated with a plurality of network manageable devices.

It is another object of the present invention to provide processes and apparatuses for using a proxy agent to retrieve management information from a plurality of network manageable devices in data communication with a management computer.

It is a further object of the present invention to provide processes and apparatuses for displaying management information from a plurality of network manageable devices in data communication with a management computer.

In accordance with one aspect of the present invention, a preferred process for managing one of a plurality of network manageable devices is provided, wherein each one of the plurality of network manageable devices has a unit of first management information associated therewith. A request is issued to a first computer from a second computer to access the unit of first management information associated with the one of the plurality of network manageable devices. A first data structure is created for storing a unit of first device information for each one of the plurality of network manageable devices with each unit of first device information identifying its respective network manageable device. The first data structure is searched for a unit of first device information associated with the one of the plurality of network manageable devices and the unit of first device information associated with the one of the plurality of network manageable devices is used to locate the unit of first management information associated with the one of the plurality of network manageable devices.

A computer system for implementing the above-described preferred process is also provided which comprises a first function in data communication with the first computer for creating a first data structure for storing a unit of first device information associated with each one of the plurality of network manageable devices. The computer system also comprises a second function for searching the first data structure for a unit of first device information associated with the one of the plurality of network manageable devices and a third function for using the unit of first device information associated with the one of the plurality of network manageable devices to locate the unit of first management information associated with the one of the plurality of network manageable devices. Having located the unit of first management information, this information can then be displayed on the second computer or modified, if so desired.

BRIEF DESCRIPTION OF THE DRAWINGS

While the specification concludes with claims particularly pointing out and distinctly claiming the invention, it is believed the same will be better understood from the following description taken in conjunction with the accompanying drawings in which:

FIG. 9 is a textual illustration of portions of MIB output files;

DETAILED DESCRIPTION OF THE PREFERRED EMBODIMENTS

Reference will now be made in detail to the present preferred embodiments of the invention, examples of which are illustrated in the accompanying drawings wherein like numerals indicate the same elements throughout the views. The present invention can accommodate apparatuses and processes for managing at least one, and, more preferably, a plurality of network manageable devices. For purposes of discussion herein, the present invention will be described with respect to the management of printer devices, wherein printer devices are intended to cover any physical device that takes a media from an input source, produces marks on that media according to some page description or page control language and puts the result in some output destination. Examples of printer devices can include dot matrix printers, inkjet printers, laser printers, and the like. While the present invention is described herein with respect to managing printer devices, it is contemplated that the present invention can be adapted to manage other network manageable devices. As used herein, the phrase "network manageable device" is intended to refer to any device which can be queried to access a unit of information relating to the device. Other examples of network manageable devices, in addition to the above-described printer devices, can include copiers, fax machines, and other input/output devices. Further, while the present invention is described herein with respect to SNMP, it is contemplated that the present invention can also be adapted to accommodate other SNMP-type management communication protocols and that this network protocol is discussed herein by way of example only.

Figure 3:
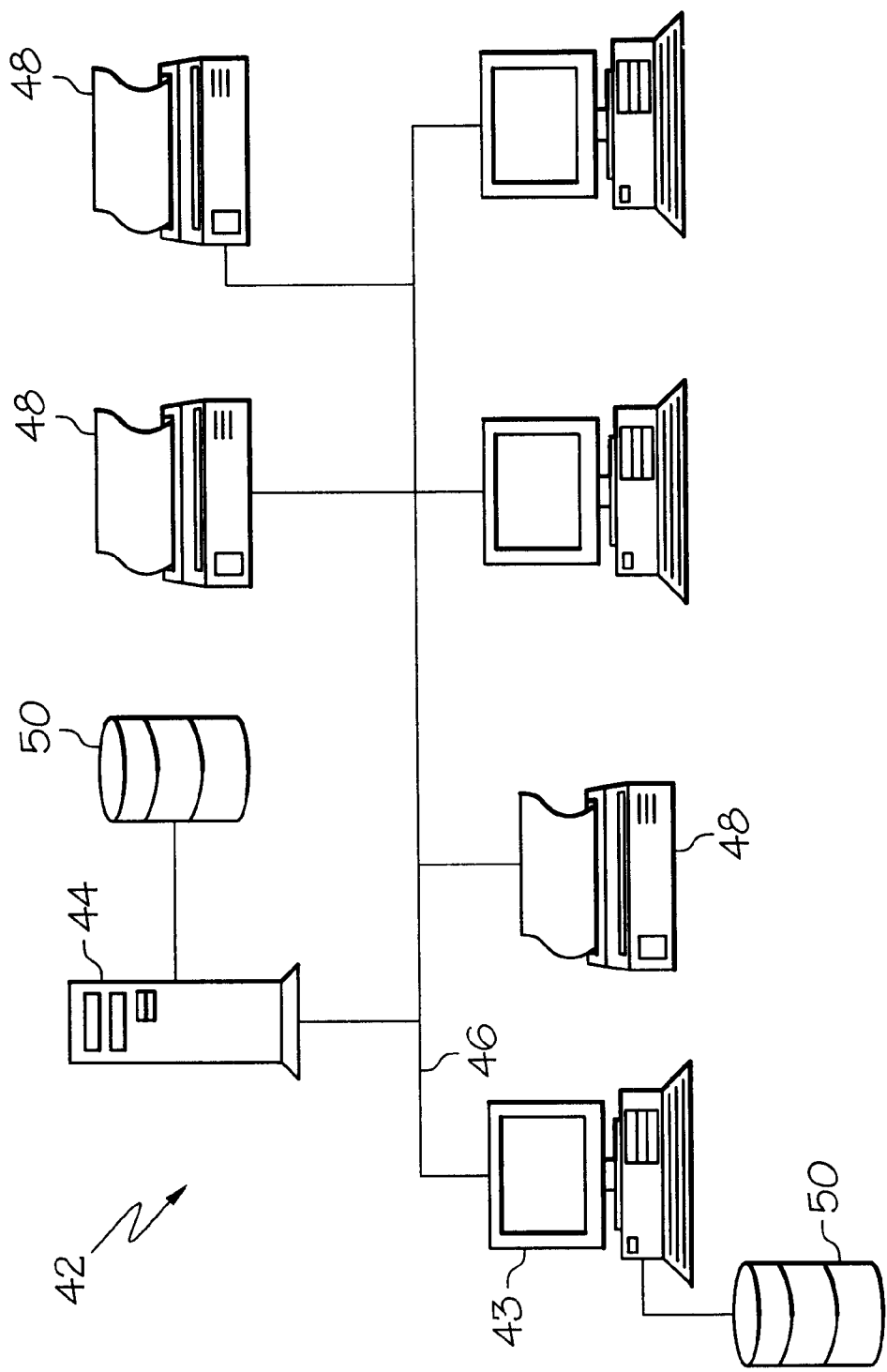
FIG. 3 is a schematic illustration of a computer system suitable for use with the present invention.

Referring now to FIG. 3, a computer system 42 in the form of a computer network suitable for use with the present invention is illustrated. The computer system 42 preferably comprises a display computer 43, a management computer 44 in data communication with the display computer 43 across network signal lines 46, and a plurality of printer devices 48 which are in data communication with and managed by the management computer 44. The display computer 43 can be provided in the form of any conventional or special-purpose computer, such as a desktop computer, a tower computer, a micro-computer, a minicomputer, and a mainframe computer and the like. The management computer 44 is preferably provided in the form of a file server or a print file server which can be multipurpose or dedicated for a single servicing task. The management computer 44 also has a network address associated therewith which uniquely identifies it within the computer system 42. The network signal lines 46 can be provided in the form of twisted pair, coaxial, optical fiber cables, telephone lines, satellites, microwave relays, and other data transmission means known to those of skill in the art.

The display computer 43 and the management computer 44 each preferably comprise a storage medium 50, which can be provided in the form of a floppy drive, a tape drive, an optical drive, or any other magnetic, optical, or computer-readable storage device having a specific physical substrate configuration. The substrate configuration represents data and instructions which cause the computer to which it is connected to operate in a specific and predefined manner as described herein. Thus, the storage medium 50 tangibly embodies a program, functions, and/or instructions that are executable by at least the display computer 43 and/or the management computer 44 to perform the steps for managing at least one, and, more preferably, a plurality of a network manageable devices according to the present invention. Other examples of an appropriate storage medium 50 can include a hard disk, a CD-ROM, PROM, RAM and the like. Those of skill in the art will appreciate that the present invention will work with a variety of other networks and computers, although particular individual devices and computer systems are described for ease of discussion.

The computer network 42 also preferably includes NOVELL network operating systems software (version 4.x). Alternatively, the network operating system can comprise Personal NETWARE Mobile, VINES, Windows NT, LAN Manager, or LANtastic network operating system software (NETWARE and NOVELL are a trademarks of NOVELL, Inc.; VINES is a trademark of Banyan Systems; NT and LAN manager are trademarks of Microsoft Corporation; and LANtastic is a trademark of Artisoft), or any other network operating system known to those skilled in the art.

Figure 4:
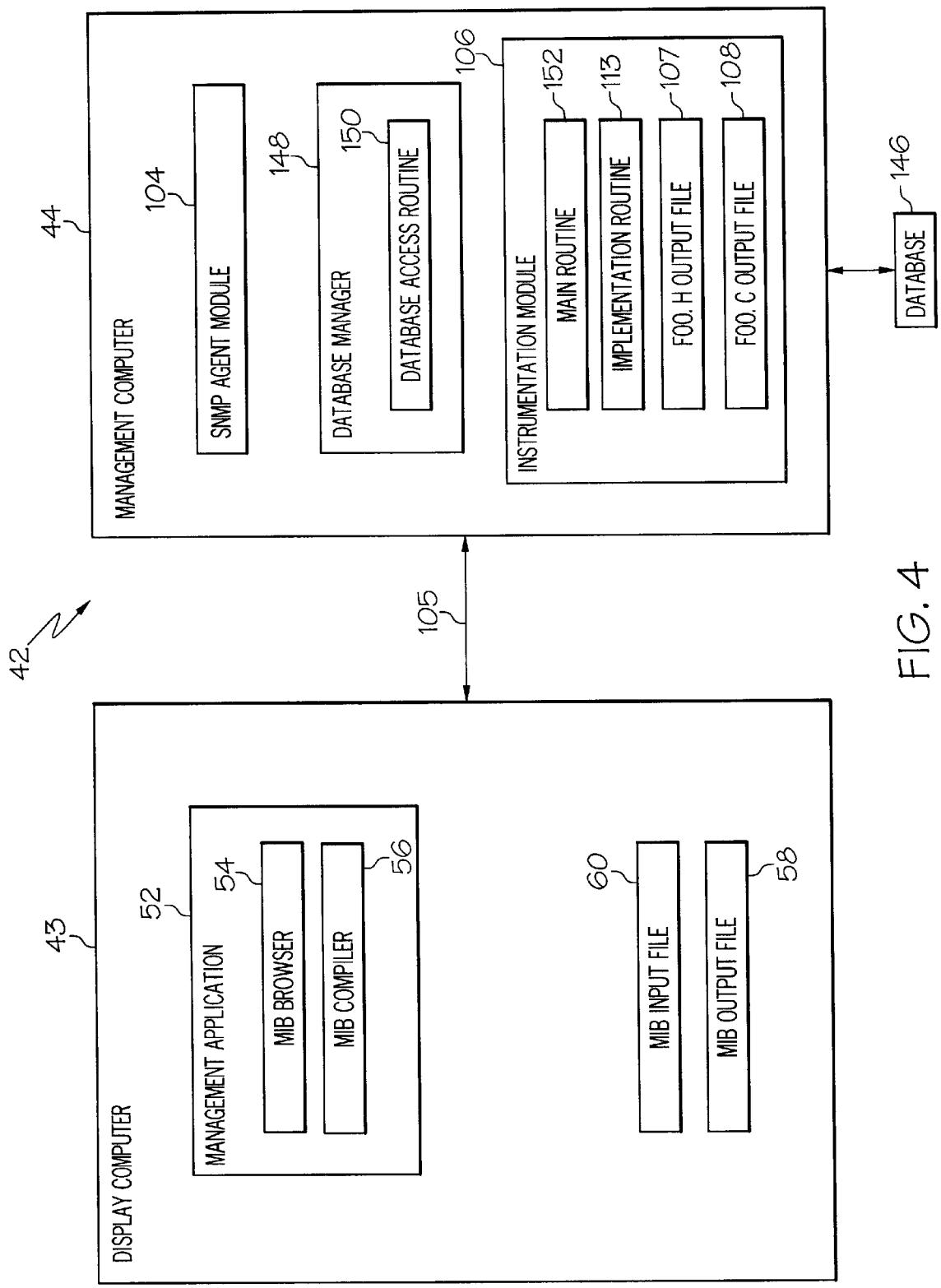
FIG. 4 is a schematic illustration of a preferred computer system made in accordance with the present invention.

Referring to FIG. 4, the computer system 42 will now be described in greater detail. The display computer 43 preferably comprises a management application 52 for displaying to a user of the display computer 43 information relating to manageable network resources, and, more preferably, one or more of the printer devices 48. More particularly, the management application 52 preferably supports SNMP and includes a MIB browser 54 and a MIB compiler 56. The MIB compiler 56 preferably generates at least one MIB output file 58 from a MIB input file 60, the MIB input file corresponding to the printer MIB item 28 and being loadable on the display computer 43. The MIB output file 58 contains standard programming structures (e.g., C programming structures) which can be used by the management application 52 to determine what management information can be accessed using SNMP requests, as discussed more fully hereafter.

Figure 5:
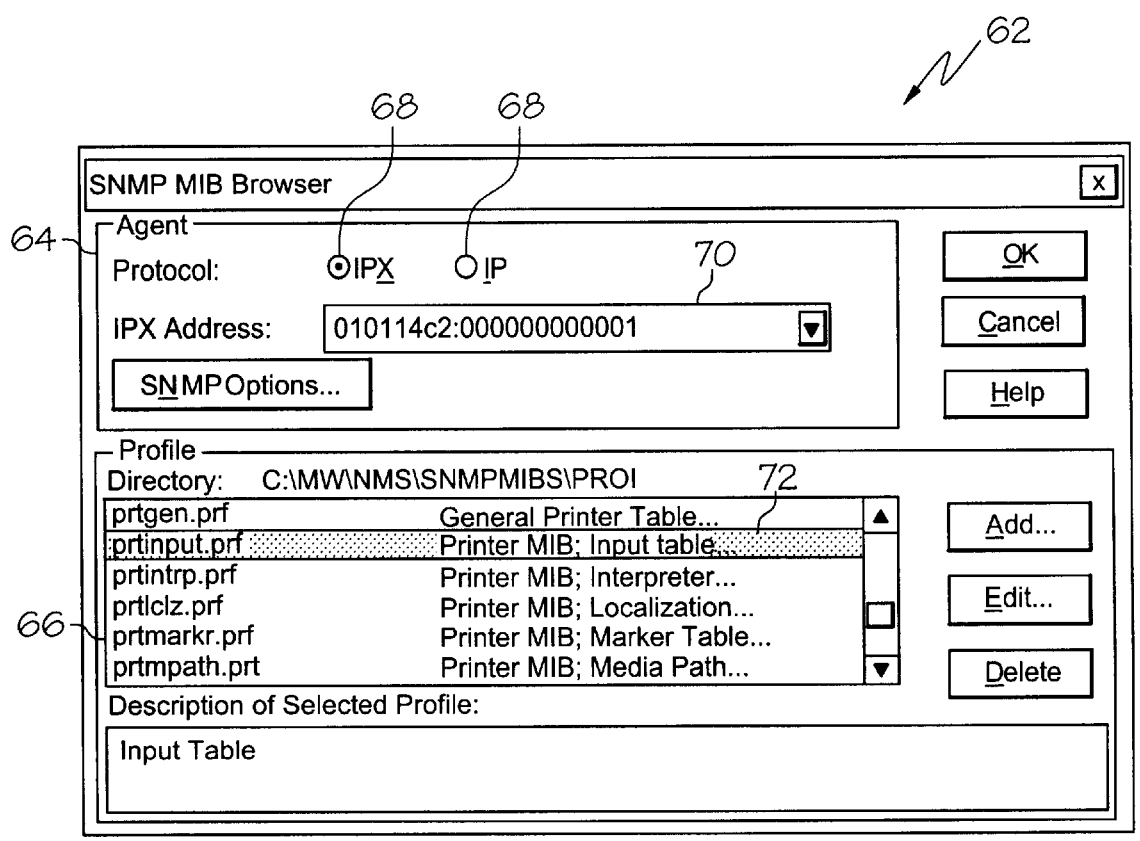
FIG. 5 is a preferred graphical display made in accordance with the present invention suitable for issuing an SNMP GETNEXT request.

In accordance with one aspect of the present invention, preferred graphical displays of the management application 52 are illustrated in FIGS. 5 to 8 in the form of WINDOWS dialog boxes. FIG. 5 illustrates an exemplary SNMP GET-NEXT graphical display 62 which preferably implements the interface for triggering an SNMP GETNEXT request for simultaneously displaying a plurality of management information associated with a plurality of printer devices 48. More preferably, the SNMP GETNEXT request graphical display 62 comprises a management computer display area 64 and a MIB item display area 66. The management computer display area 64 preferably contains protocol buttons 68 for selecting the type of network protocol associated with the address of the management computer 44, this address being displayed in an address field 70. Two exemplary protocol buttons 68 representing the Internet Protocol (IP) and NOVELL, Inc.'s Internet Packet Exchange (IPX) are shown along with an exemplary IPX address of 010114c2:000000000001 in the address field 70. The MIB item display area 66 preferably displays the groups of tabular and/or scalar MIB item management information which can be retrieved and displayed on the display computer 43 and which are associated with the printer devices 48 managed by the management computer 44 at the IPX address shown in the address box 70. For example, field 72 of the MIB item display area 66 has been selected in FIG. 5, this field being associated with the printer input table item 36. As discussed more fully hereafter, the MIB items which can be selected in the MIB item display area 66 are most preferably abstract MIB objects which are generated by the MIB compiler 56 and which are defined in the MIB output file 58. A MIB abstract object is a logical grouping of MIB items which terminate a branch in the tree 20. For example, each of the MIB items under the input entry item 38 (e.g., input index item 39, input type item 40, etc.) can be grouped together as an abstract MIB object called input entry (e.g., 130 of FIG., 9) because each of the MIB items thereunder do not have further MIB items under them.

Figure 6:
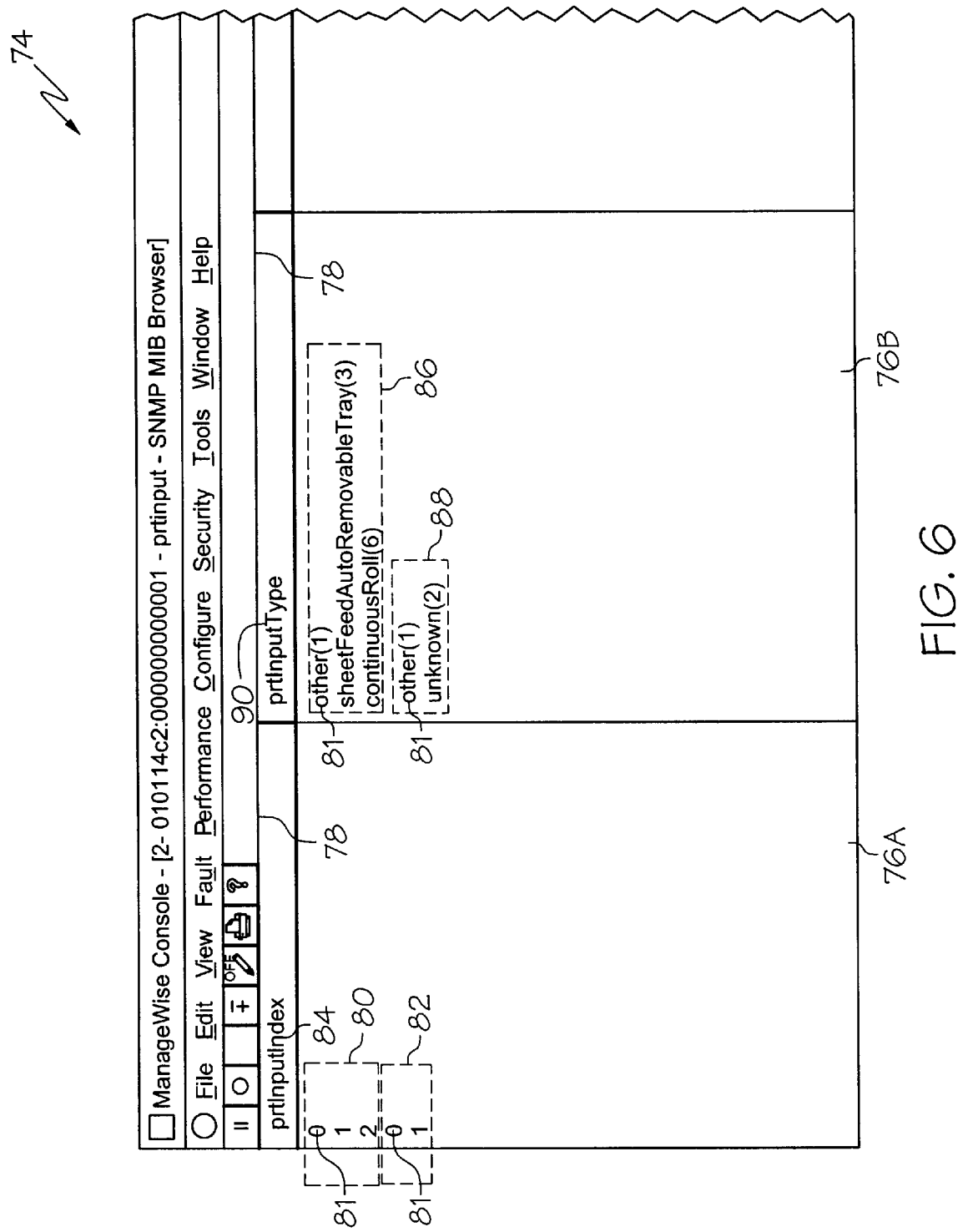
FIG. 6 is a preferred graphical display made in accordance with the present invention for displaying the results of a GETNEXT request issued from the graphical display of FIG. 5.

FIG. 6 illustrates an exemplary SNMP GETNEXT results graphical display 74 which displays management information for a plurality of printer devices 48, this information being displayed in response to the selections made in the SNMP GETNEXT graphical display 62. The exemplary display of FIG. 6 preferably comprises a plurality of MIB item value display areas 76 (e.g., 76A, 76B) for displaying the management information. More preferably, each MIB item value display area 76 displays for a plurality of printer devices 48 the units (i.e., values) of management information associated with a single MIB item, such as the input index item 39 and the input type item 40 as shown in FIG. 6. Adjacent each MIB item value display area 76 is preferably an associated MIB item title display area 78 having a string of characters describing the MIB item displayed in its corresponding MIB item value display area. For example, FIG. 6 illustrates a first group 80 of MIB item values 81 associated with the input index item 39 of a first printer device and a second group 82 of MIB items values 81 associated with the input index item 39 of a second printer device, these values being displayed in MIB item display area 76A and adjacent input index text 84 describing the input index item 39. Likewise, a third group 86 of MIB item values associated with the input type item 40 of the first printer device and a fourth group 88 of MIB item values associated with the input type item 40 of the second printer device are shown in the MIB item value display area 76B. An input type text 90 describing the input type item 40 appears adjacent the MIB item value display area 76B containing the third group 86 and the fourth group 88.

Figure 7:
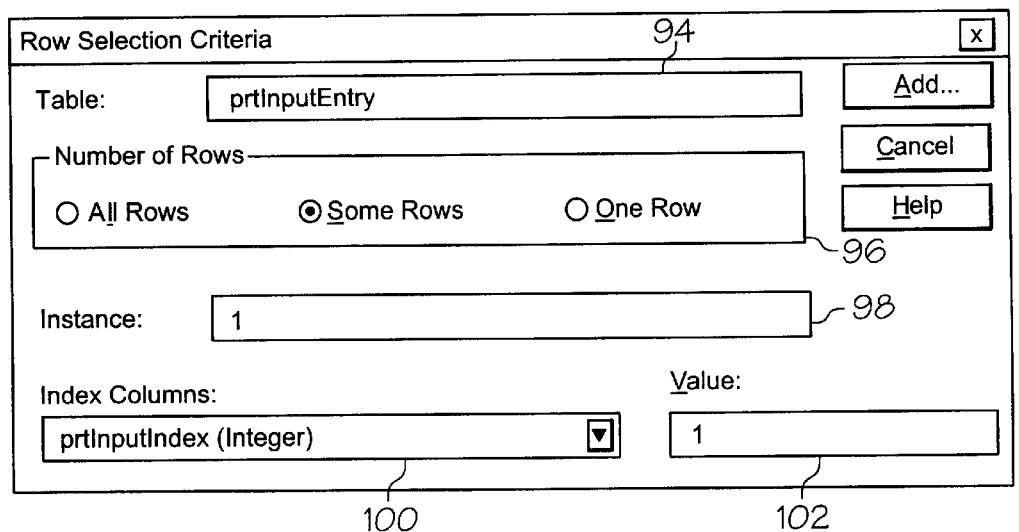
FIG. 7 is a preferred graphical display made in accordance with the present invention suitable for issuing an SNMP GET request.

FIG. 7 illustrates an exemplary SNMP GET graphical display 92 which preferably implements the interface for triggering an SNMP type GET request. More preferably, the SNMP GET graphical display 92 comprises a MIB item field 94, a row field 96 if the MIB item selected in the MIB item field 94 is a table, a device index value field 98, an associated index text field 100, and an associated index value field 102. The MIB item field 94 provides an area for selecting or inputting the MIB item to be queried (i.e., the MIB item for which values are to be displayed), and, if this item is a table, the row field 96 is preferably displayed for inputting the number of table rows to be displayed. The device index value field 98 provides an area for selecting or inputting the particular device index value associated with the printer device to be queried. The associated index value field 102 provides an area for selecting or inputting a second or associated index value if appropriate (i.e., if a table item has been selected as illustrated in FIG. 7). For example, FIG. 7 illustrates an exemplary graphical display wherein the MIB item values to be later displayed are associated with the printer input entry item 38 (also an abstract MIB object as later discussed) for a printer device having a device index value of 1. More particularly, the row of this table associated with the an input index value of 1 (i.e., associated with the printer input sub-unit designated as 1) will be displayed.

Figure 8:
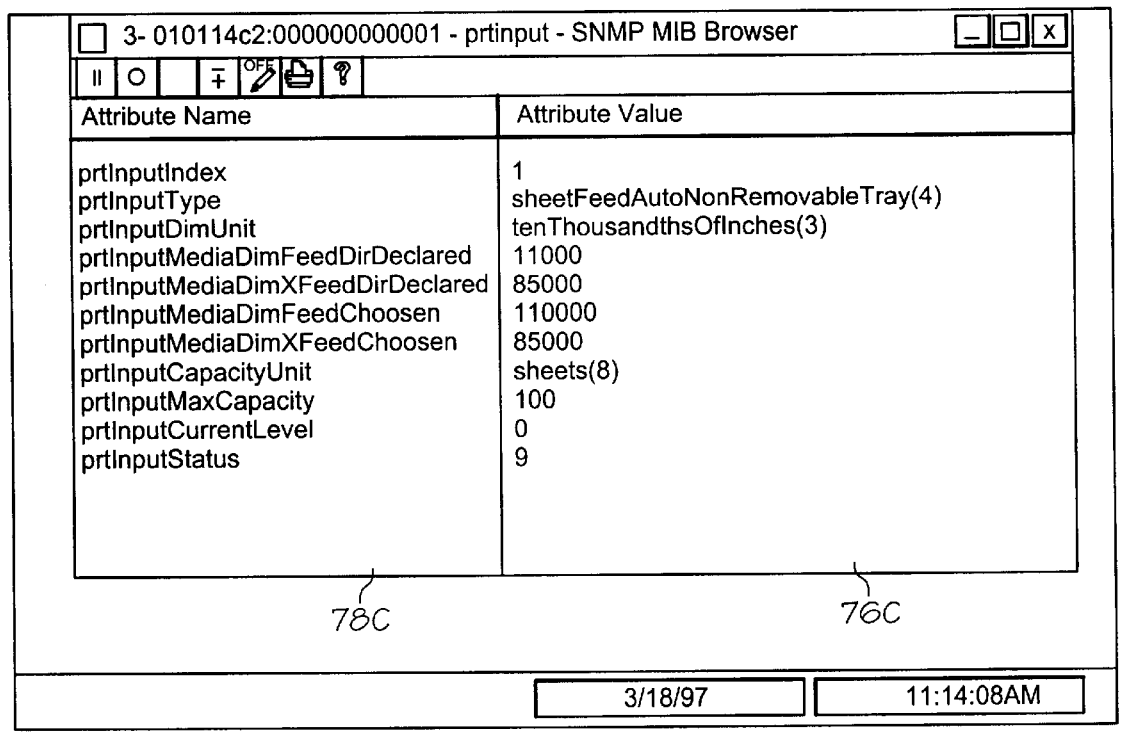
FIG. 8 is a preferred graphical display made in accordance with the present invention for displaying the results of a GET request issued from the graphical display of FIG. 7.

FIG. 8 illustrates a preferred SNMP GET results graphical display 102 which displays management information for a plurality of printer devices 48, this information being displayed in response to the selections made in the SNMP GET graphical display 92. The SNMP GET results graphical display 102 preferably comprises at least one MIB item value display area 76 (e.g., 76C) and at least one MIB item title display area 78 adjacent the MIB item value display area 76. In this graphical display, the MIB item value display area 76 shows the value for each MIB item displayed in MIB item title display area 78. For example, the MIB item title display area 78C of FIG. 8 displays the textual descriptions of the MIB items located under the input entry item 38, the input entry item 38 having been selected in the MIB item field 94 of companion FIG. 7. Adjacent the MIB item title display area 78C is the MIB item value area 76C which displays the MIB item values (i.e., units of management information) for the MIB items (i.e., types of management information) displayed in the MIB item value area 76C. More particularly, only the row of MIB item values in the MIB table associated with an input index value of 1 (i.e., the associated index value displayed in the associated index value field 102 in companion FIG. 7) are displayed. While the preferred graphical displays 62, 74, 92, and 102 are discussed herein with respect to the printer input table of the printer MIB item 28 and certain MIB items and MIB item values thereunder, it is contemplated that the same displays can be adapted to accommodate simultaneously displaying a plurality of tabular values or scalars for a single printer device or a plurality of printer devices for other MIB items under the printer MIB item 28 or a plurality of tabular or scalar values for other MIBs, as desired. It is further contemplated that the graphical displays of the present invention can be configured in various ways, incorporating, for example, various arrangements of scroll bars, window sizes and arrangements, menu bar items, status bar items, tool bar items, and the like.

Referring again to FIG. 4, the management computer 44 preferably comprises an SNMP agent module 104 and an instrumentation module 106. The SNMP agent module 104 preferably has a set of instructions for responding to SNMP requests initiated by the management application 52 of the display computer 43 and transmitted to the management computer 44 across the network connection 105. The three SNMP operations which are used to transmit data between the display computer 43 and the management computer 44 can include the GET, GETNEXT, and SET requests as previously discussed. The GET and GETNEXT operations retrieve management information, preferably defined by the printer MIB item 28, and return it to the display computer 43 while the SET operation manipulates this information.

The instrumentation module 106, which is in data communication with the SNMP agent module 104, is preferably adapted to provide the routines which access and manage the management information defined by the printer MIB item 28 and which is associated with each of the printer devices 48 managed by the management computer 44. In this manner, the instrumentation module 106 can be adapted to execute its information retrieval functions at a higher level without directly implementing the specific SNMP constructs with which the SNMP agent module 104 is concerned. Because the instrumentation module 106 of the present invention can access management information relating to a plurality of printer devices, or other network manageable devices, the combination of the SNMP agent module 104 and the instrumentation module 106 can be referred to as a proxy agent. In other words, a proxy agent is intended to refer to a computer program, module, routine, or combinations thereof, which is preferably located on a single computer and which can access management information associated with a plurality of network manageable devices. The SNMP agent module 104 and the instrumentation module 106 can be provided in the form of NETWARE Loadable Modules (NLMs) which operate on the NETWARE operating system.

Figure 1:
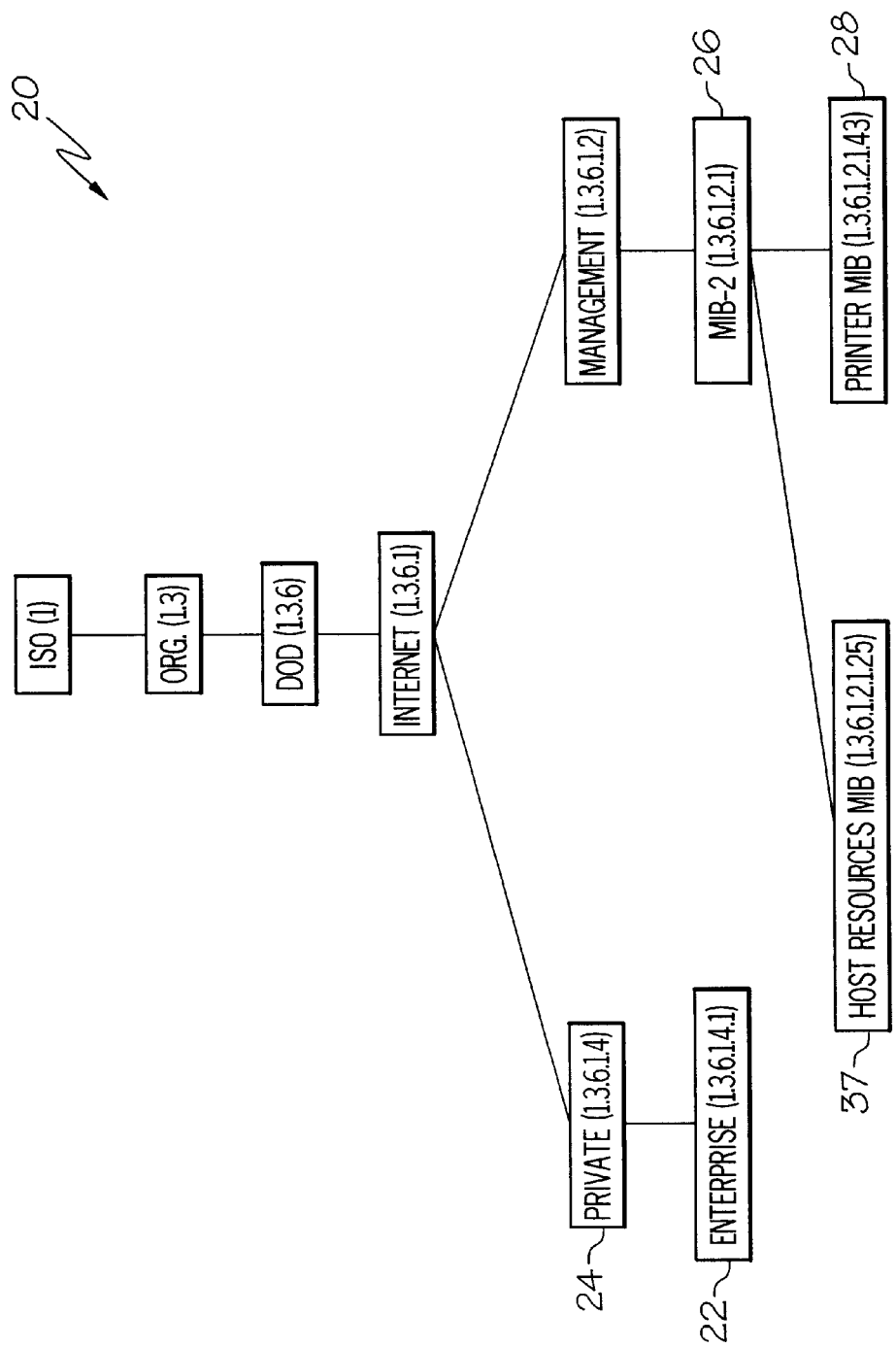
FIG. 1. is a partial schematic illustration of a tree illustrating the organizational framework defined by the Internet community for network information.
Figure 2:
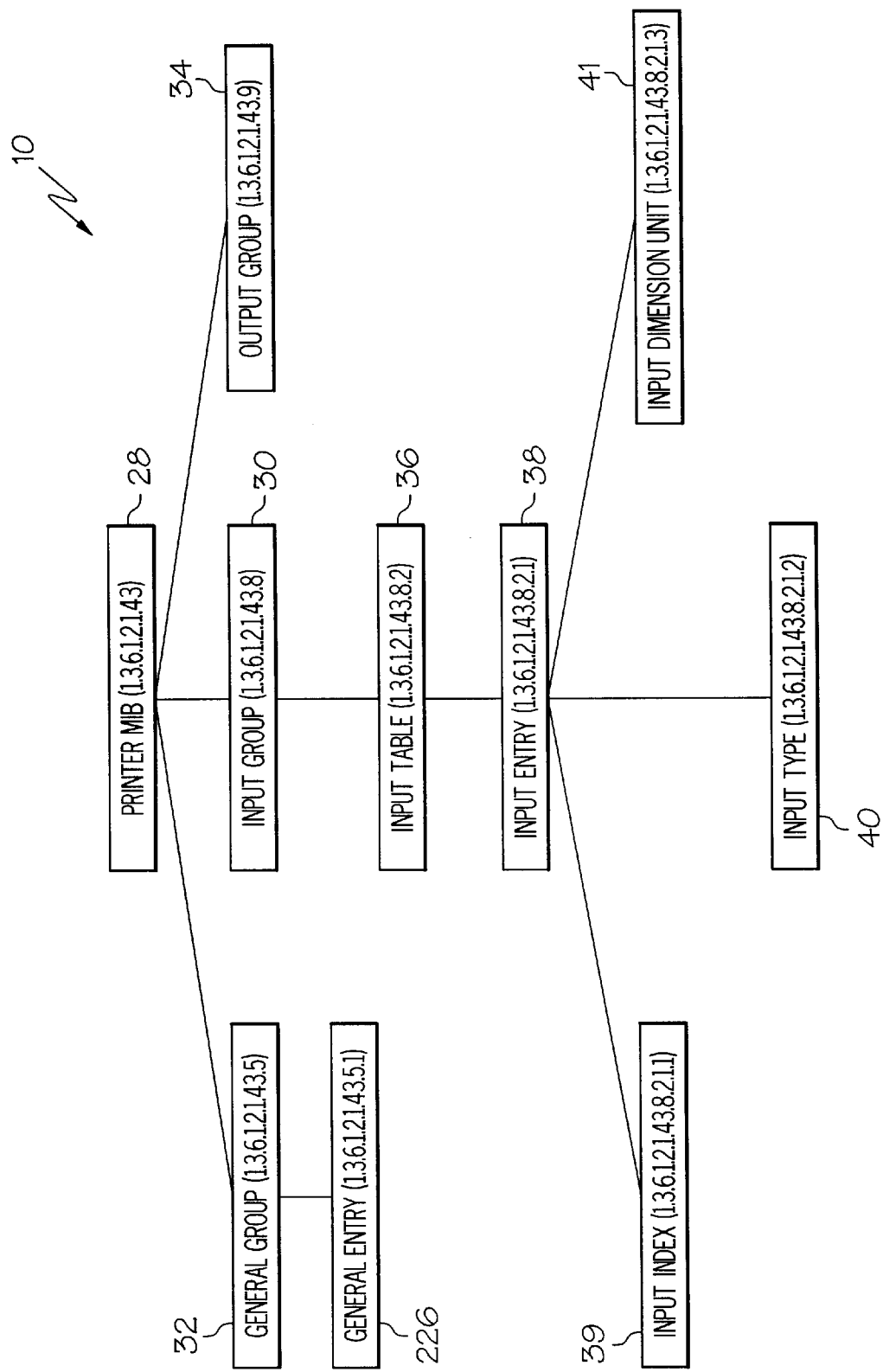
FIG. 2 is a partial schematic illustration of the printer MIB item shown in FIG. 1.

For clarity of later discussion, the conventional aspects of the management computer 44 will now be described. These aspects are described in greater detail in the publication "SNMP Agent For NetWare Developer's Guide", 1992 December edition, published by NOVELL, Inc., of Provo, Utah, the substance of which is hereby incorporated herein by reference. An SNMP agent MIB compiler (not shown) is used to compile a printer MIB input file into data structures having a format which can be used during development of the instrumentation module 106. Preferably, the SNMP agent MIB compiler is provided in the form of NOVELL, Inc.'s Software Development Kit (SDK) MIB compiler which is an executable computer program that converts the MIB input file (such as the MIB input file 60 located on the display computer 43) into FOO.H and FOO.C MIB output files 107 and 108 containing C programming language data structures, these data structures being associated with logical groups of MIB items with the groups being referred to herein as a MIB abstract objects. These MIB output files are used during compilation of the instrumentation module 106. Shown in FIG. 9 are exemplary portions of MIB output files generated by NOVELL, Inc.'s SDK MIB compiler from a MIB input file associated with the printer MIB item 28. Particularly, there are two output files, an 1759.H output file 107A and an 1759.C output file 108A. The 1759.H file contains #define statements which correspond to a particular MIB item within the printer MIB item 28. Each #define statement declares for a given MIB item the digit(s) comprising the last sub-OBJECT IDENTIFIER. For example, the prtInputIndex define statement 109 declares a value of 1 which corresponds to the last sub-OBJECT IDENTIFIER of the input index item 39 shown in FIG. 2. As described more fully hereafter, the 1759.C output file contains C data structures which can be used by the SNMP agent module 104 to understand the MIB items which are associated with a particular instrumentation module 106. In this manner, a single SNMP agent module 104 can interface with a plurality of distinct instrumentation modules 106 where each instrumentation module is adapted to access management information associated with its specific MIB items defined in a MIB output file. For instance, the management computer 44 could be provided with a plurality of instrumentation modules with each instrumentation module being associated with a different MIB, such as the printer MIB item 28 or the host resources MIB item 37 of FIG. 1.

Figure 10:
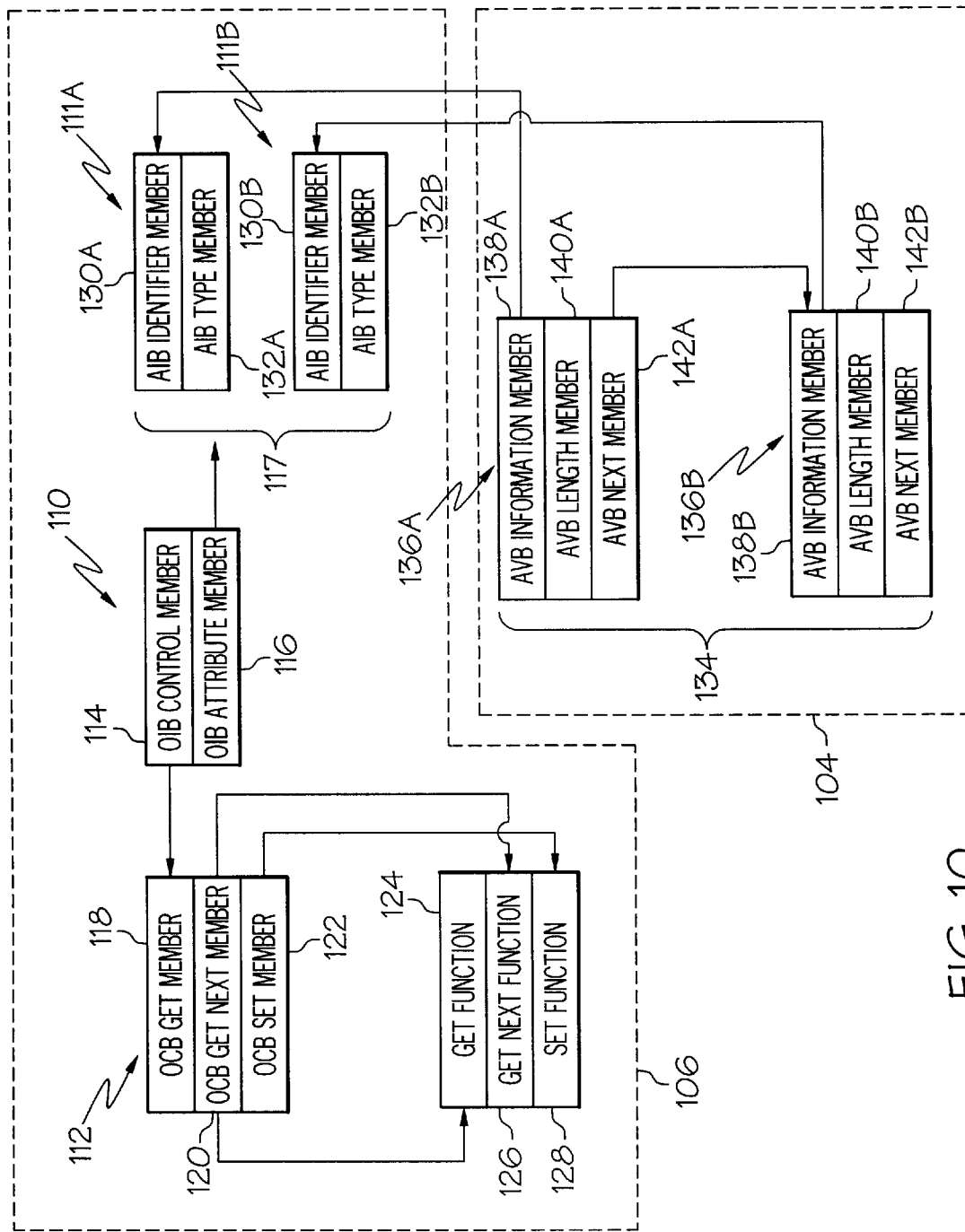
FIG. 10 is a schematic illustration of data structures suitable for use with the present invention.

As shown in FIG. 10, the instrumentation module 106 preferably defines at least 3 data structures for each abstract MIB object defined in the MIB output files, including an object information block 110 located in the FOO.C output file 108, an attribute information block 111 also located in the FOO.C output file 108, and an object control block 112 located an implementation routine 113. The object information block 110 provides references, such as a pointer, to each of the other two data structures. Thus, the object information block 110 comprises an oib control member 114 and an oib attribute member 116, these references pointing to the object control block 112 and the attribute information block 111, respectively. The object control block 112 preferably comprises an ocb get member 118, an ocb GETNEXT member 120, and an ocb set member 122. These members provide references to a get function 124, a GETNEXT function 126, and a set function 128 located in the implementation routine 113 and which are called by the SNMP agent module 104 when the SNMP agent module 104 receives an SNMP request (e.g., GET, GETNEXT, SET) from the display computer 43. For instance, an exemplary input entry object information block 110A and input entry object control block 112A are illustrated in FIG. 9 as they relate to input entry abstract MIB object 130. The input entry object control block 112A declares the functions inTableGet and inTableGetNext which are associated with the OCBGET (the call preferably initiated by the SNMP agent module in response to a GET request from the display computer) and an OCBGETNEXT call (the call preferably initiated by the SNMP agent module in response to a GETNEXT request from the display computer), respectively, so that the SNMP agent module 104 call the proper function for implementing SNMP requests from the display computer 43 associated with the input entry MIB abstract object 130 which defines each of the MIB items located under the input entry item 38. From the foregoing, it should be realized that the instrumentation module 106 can comprise a plurality of implementation routines 113, each implementation routine 113 being associated with a unique MIB abstract object if so desired (e.g, an input entry MIB abstract object, a general entry MIB abstract object, an output entry MIB abstract object, etc.).

The attribute information block 111 describes the characteristics of a particular MIB item, and more preferably, describes the characteristics of a MIB item within a MIB abstract object. These characteristics are derived from the FOO.C output file 108. An attribute information block array 117 can be provided which comprises a plurality of attribute information blocks 111. Preferably each attribute information block 111 (e.g., 111A, 111B) comprises an aib identifier member 130 for storing the last sub OBJECT IDENTIFIER digits (i.e., the integers following the last period in an object identifier) of a MIB item and an aib type member 132 for storing the data type (e.g., integer, octet string, etc.) of a value for a MIB item. The values for these members are declared in the FOO.C output file. For example, the exemplary RFC 1759.C output file 108 illustrated in FIG. 9 declares an input entry attribute information block array 117A associated with the input entry abstract MIB object 130. The input entry attribute information block array 117A defines the characteristics of the input index item 39 and the input type item 40 in the first attribute information block 111A and the second attribute information block 111B, respectively.

The SNMP agent module 104 preferably contains a null terminated attribute value block linked list 134 comprising a plurality of attribute value blocks 136 (e.g., 136A and 136B). Each attribute value block 136 stores the values of selected MIB items, versus the characteristics of those values which are stored in the associated attribute information blocks 111. More preferably, each attribute value block 136 has an avb information member 138, an avb length member 140, and an avb next member 142. The avb information member 138 refers to the particular attribute information block 111 that describes the characteristics of the values stored in the attribute value block 136. Thus, the attribute value blocks 136 permit the SNMP agent module 104 to handle the values of MIB items in a general way without knowing their characteristics, unless desired in which case the attribute information block 111 associated with the attribute value block 136 can be accessed using the avb information member 138. Thus, the linked list 134 provides a means for transferring the values of specific MIB items retrieved by the instrumentation module 106 and de-referencing them so that they can be manipulated by the SNMP agent module 104 and returned to the display computer 43 via an SNMP response, as will be discussed more fully hereafter.

As shown in FIG. 4 and in accordance with another aspect of the present invention, the management computer 44 is preferably in data communication with a database 146 which stores both static and dynamic values for the MIB items associated with each printer device 48 managed by the management computer 44. More preferably, the database 146 is an object-oriented database defining classes based upon the MIB items defined by the printer MIB item 28. The classes can correspond to each of the printer MIB group item (e.g., 30, 32, 34, etc.) with objects under these classes being preferably identified by their OBJECT IDENTIFIERS and/ or the indexes previously discussed. The database 146 is preferably managed by a database manager 148 which can read and write to the database 146 and which is located on the management computer 44. Each object in the database 146 preferably has an identifier for the object, a value for the object, an update flag for the object indicating whether the object should be updated when the value of the object changes, and an event notification flag indicating whether to generate messages for changes in an object value. The database manager 148 can be provided with an access routine 150 which queries the printer devices 48 having associated objects in the database 146 on a periodic interval to retrieve the values of these objects if the object's update flag has been set to the on condition.

Figure 11:
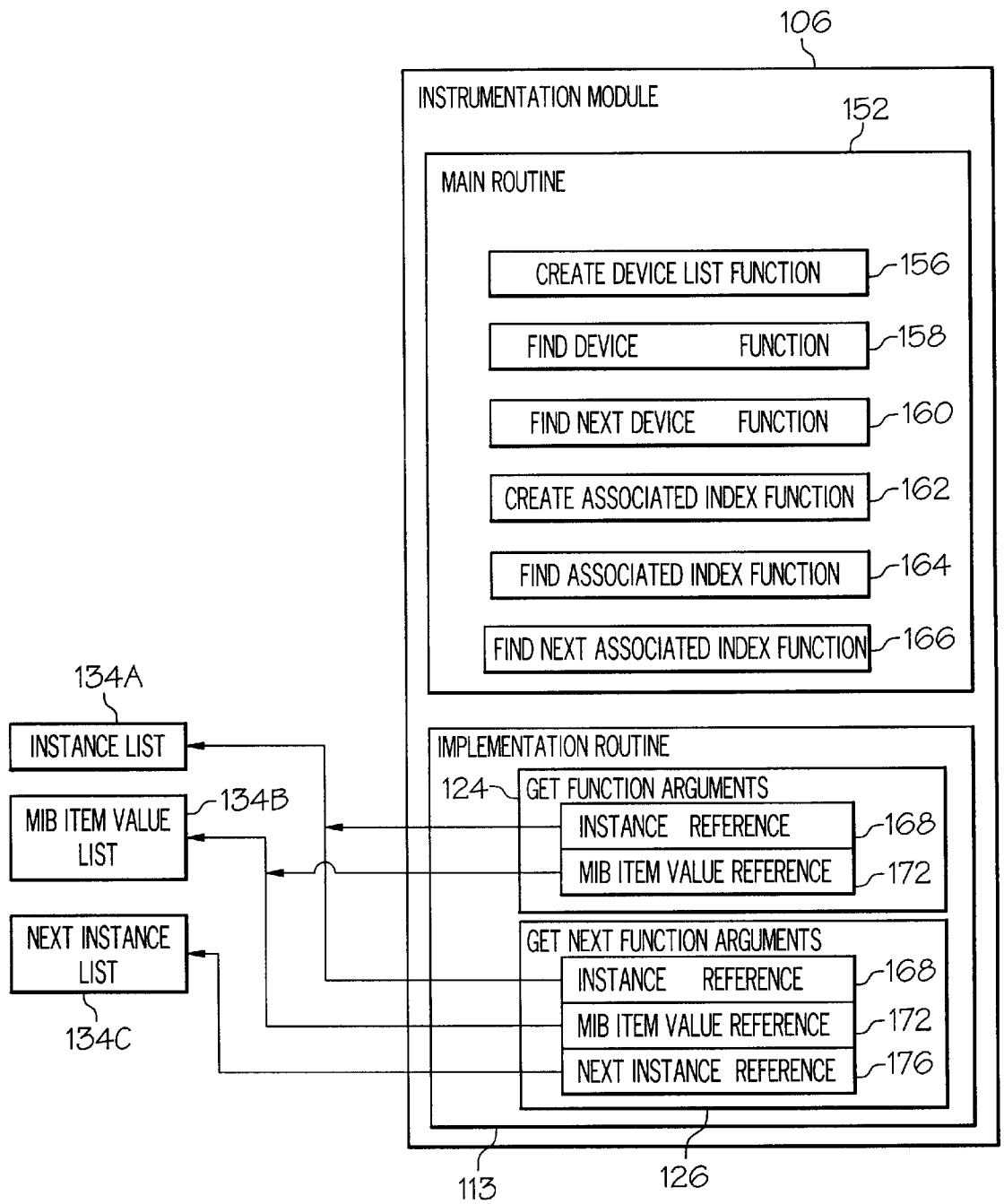
FIG. 11 is a schematic illustration of a preferred instrumentation module made in accordance with the present invention.

Referring to FIG. 11, a preferred instrumentation module 106 made in accordance the present invention will now be described. A main routine 152 is provided which comprises the following functions: a create device list function 156, a find device function 158, a find next device function 160, a create associated index (e.g., input index) function 162, a find associated index function 164 and a find next associated index function 166. The create device list function 156 and create associated index function 162 are used to create null-terminated linked lists, each of which comprise at least one unit of device information. As used herein, the phrase "unit of device information" is intended to refer to a single value of device information which identifies a network manageable device. While the device information can be of different types (e.g., first device information could be, for example, a name), the create device function 158 preferably creates null terminated linked list comprising at least one unit, and, more preferably, a plurality of units of first device information in the form of device indexes, (e.g., hrDeviceIndex) while the create associated index function 162 creates a null terminated linked comprising at least one unit, and, more preferably, a plurality of units of second device information in the form of associated indexes (e.g., input index). While the present invention is described herein with respect to these null terminated linked lists, it is contemplated that other data structures (e.g., arrays, structures having member structures, linked lists of structures, etc.) capable of providing the same functionality can be equally substituted therefor. The find device function 158 and the find associated index function 164 are used to search their respective lists for predetermined index values. The find next device function 158 and the find next associated index function 164 are used to search for a next index value based upon an existing index value. While the device index, hrDeviceIndex, and its associated index, the input index, of the input entry item 38 are discussed hereafter by way of example, it will be realized that other MIB defined indexes can be substituted equally therefor.

The implementation routine 113 preferably comprises two functions: the GET function 124 and the GETNEXT function 126 which are called by the SNMP agent module 104 in response to an SNMP GET request or an SNMP GET-NEXT request from the display computer 43, as described more fully hereafter. The GET function 124 of the implementation routine 113 preferably receives at least two arguments: an instance reference 168 to an instance list 134A comprising attribute value blocks 136, and a MIB item value reference 172 to a MIB item value list 134B also comprising attribute value blocks 136 (i.e., 134A and 134B are null-terminated lists of the type attribute value block linked list 134). Thus, the GET function 124 has available to it the values stored in the avb information member 138, avb length member 140, and avb next member 142 of the attribute information blocks 136 of the instance list 134A. For example, a user who triggers an SNMP GET request through the SNMP GET request graphical display 92 of FIG. 7 specifies a MIB abstract object (e.g., prtInput entry), a device index value in the device index value field 98, and an associated index value (e.g., input index) in the associated index value field 102. The device index value and the associated index value are passed by the management application 52 in the form of an SNMP GET request to the SNMP agent module 104 which places the device index value in the avb length member 140A of the first attribute value block 136A of the instance list 134A and the associated index value in the avb length member 140B of the second attribute value block 136B.

The GETNEXT function 126 preferably receives the same previously described arguments as the GET function 124. In addition, the GETNEXT function 126 also has a next instance reference 176 which is a reference to a next instance list 134C comprising attribute value blocks 136 (i.e., 134C is a null-terminated list of the type attribute value block linked list 134), wherein the next device index value and the associated index value for the next device instance are stored. As used herein, the phrase "device instance" is intended to refer to a specific combination of indexes which are associated with a network manageable device, such as a printer device. For example, a specific hrDeviceIndex value and input index value can be used to identify a specific printer device and one of its input sub-units. The next device instance could have the same hrDeviceIndex value (i.e., same device index value) but a new input index value (i.e., new associated index value) which corresponds with the next input sub-unit for that printer device, or the next device instance could be a new hrDeviceIndex value associated with another printer device as well as a new input index value for the first input sub-unit of that printer device.

Figure 12:
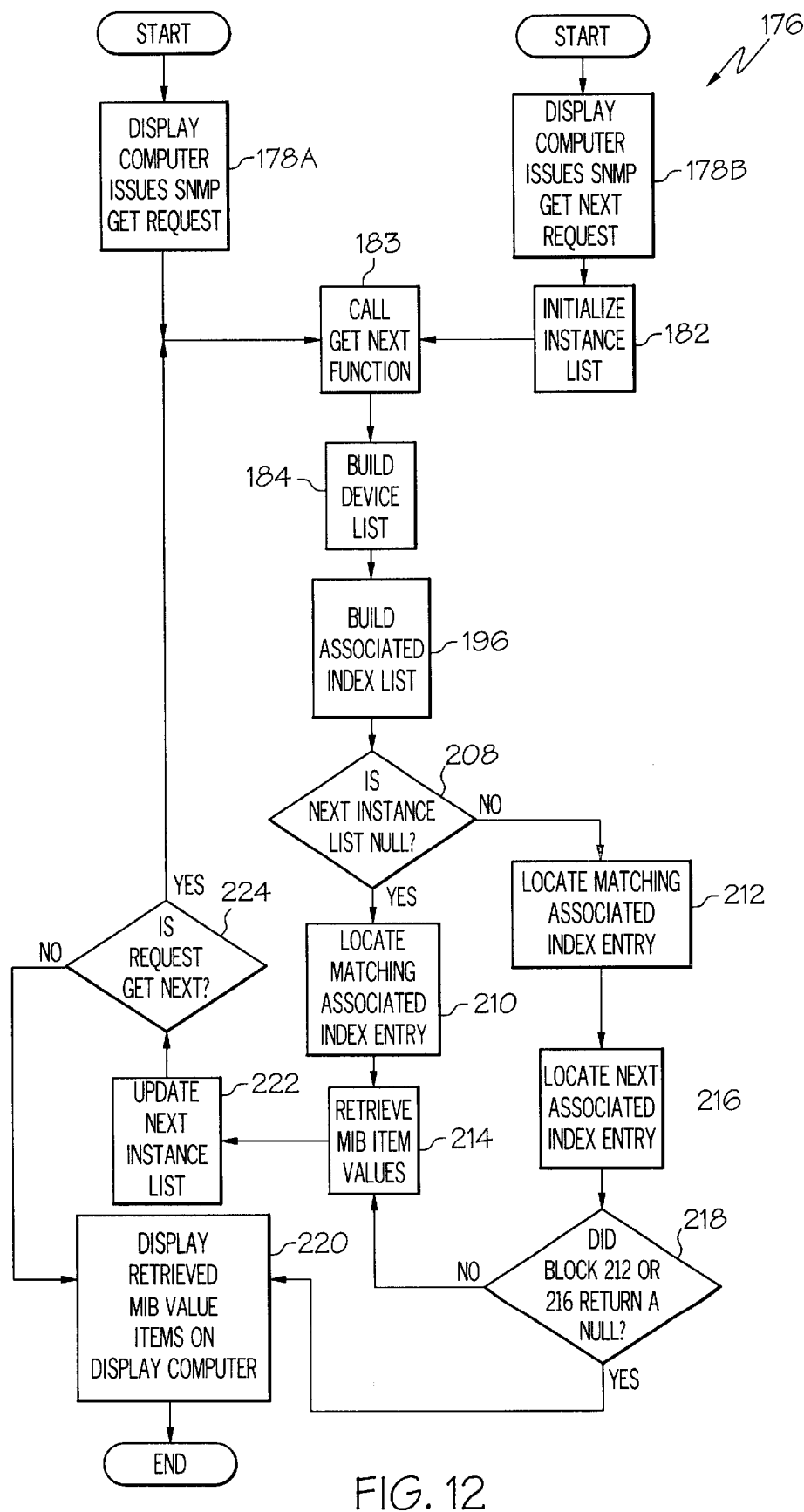
FIG. 12 is a preferred process made of the present invention which can be implemented by the computer system of FIG. 4.
Figure 13:
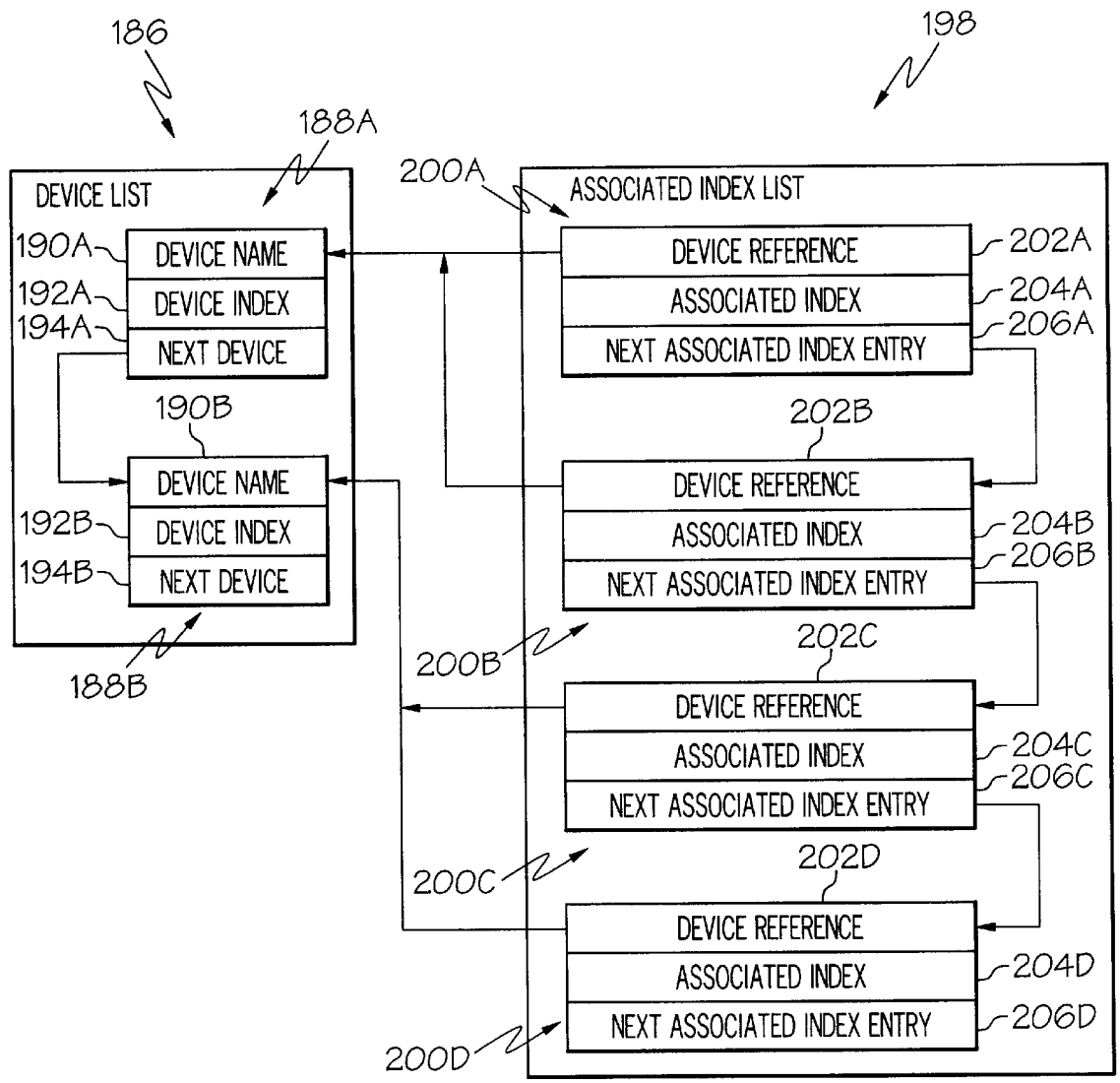
FIG. 13 is schematic illustration of preferred data structures made in accordance with the present invention which are utilized by the process of FIG. 12.

Referring now to FIGS. 11, 12 and 13, a preferred process 176 of the present invention for accessing management information associated with a plurality of network manageable devices will now be described. While the preferred process 176 will be described herein with respect to an exemplary SNMP GET or GETNEXT request, other SNMP operations can be implemented using the processes and apparatuses of the present invention. For instance, an SNMP SET request to set a MIB item value associated with a plurality of printer devices could also be accommodated using the present invention. Further, for clarity of discussion, the exemplary process 176 will be discussed in the context of the input group item 30 of the printer MIB item 28 with the understanding that the processes and apparatuses of the present invention can also be adapted to accommodate accessing MIB item values associated with the other group items (e.g., the output group item 34) of the printer MIB item 28 or other MIB like-databases in general.

As shown in FIG. 12, execution begins in either block 178A or 178B where the display computer 43 issues an SNMP request to the management computer 43, this request being triggered by a user of the display computer 43 preferably through one of the preferred graphical displays previously described. For example, the display computer 43 can issue an SNMP GET request in block 178A which is triggered by the selections made in the SNMP GET graphical display 92. The SNMP GET request issued by the display computer 43 preferably passes the OBJECT IDENTIFIER for the MIB item, and more preferably the OBJECT IDEN- TIFIER for the MIB abstract object defined by the MIB output files, selected in the SNMP GET graphical display 92 along the device index value and the associated index value selected in fields 98 and 102, respectively. Alternatively, the display computer 43 can issue an SNMP GETNEXT request in block 178B which is triggered by the selections made in the SNMP GETNEXT graphical display 62. The SNMP GETNEXT request issued by the display computer 43 preferably passes the value of the network address of the management computer 44 managing the printer devices 48 for which management information is desired. In addition, the SNMP GETNEXT request issued by the display computer 43 also preferably passes the OBJECT IDENTIFIER for the MIB item, and more preferably the OBJECT IDENTIFIER for the MIB abstract object defined by the MIB output files, selected in the SNMP GETNEXT graphical display 62.

When an SNMP GET or GETNEXT request is received by the SNMP agent module 104, the SNMP agent module 104 searches the object information blocks 110 for an abstract MIB object associated with the SNMP request. Upon locating the proper object information block 110, the SNMP agent module 104 accesses the oib attribute member 116 and locates the attribute information block array 117 defined in the MIB output file FOO.C and place this information in the MIB item value list 134B. For example with respect to the RFC1759.C output file 108A of FIG. 9, the attribute information blocks 111A and 111B for the input entry abstract object 130 contain the aib identifier member information and the aib type member information associated with the input index item 39 and the input type item 40 (e.g., for the input index item 39 these members have values of values of 1 and integer respectively).

If the SNMP is a GET request, the SNMP agent module 104 of the management computer 44 stores in the instance list 134A the device index and associated index values passed from the display computer 43 in block 178A. More particularly, the device index value (e.g., hrDeviceIndex) is stored in the avb length member 140A of the attribute value block 136A of the instance list 134A and the associated index value (e.g., the input index value) is stored in the avb length member 140B of the attribute value block 140B of the instance list 134A, with the avb next member 142A associating the two attribute value blocks and the avb next member 142B storing a NULL value. If the SNMP request is a GETNEXT request, block 182 is executed wherein the instance list 134A is initialized with the first device index value and the first associated index value for the printer device having this device index value and the next instance list 178 is set to a NULL value, for reasons described more fully hereafter.

The SNMP agent module 104 next preferably uses the oib control member 114 to locate the object control block 112 defined in the implementation routine 113 and which is associated with the abstract MIB object which is the subject of the SNMP request. The SNMP agent module 104 then calls the appropriate routine (e.g., get function 124 or getnext function 126) for this MIB abstract object. In the particularly preferred process 176, the get function 124 eventually calls the getnext function 126 in block 183 such that blocks 184 onward are executed regardless of whether the SNMP request is a GET request or a GETNEXT request. This provides a more efficient process while still accommodating the capability for separate error checking for each of the calls. Because the getnext function 126 requires a next instance list reference 176, the getnext function call from the get function 124 passes in a NULL value for this list.

In block 184, the create device list function 156 is called to create a device list 186, shown in FIG. 13. Each device entry 188 (e.g., 188A and 188B) preferably comprises at least one unit of device information which identifies a particular network manageable device. More preferably, each device entry 188 comprises three types of device information which include a device name member 190 for storing a name of a printer device, a device index member 192 for storing the value of a device index, and a next device member 194 for storing a reference to the next entry in the device list 186. The last entry in the device list 186 preferably has a NULL value stored in the next device member 194 which indicates the end of the list. The device name and device index values are defined by the host resources MIB item 37 (FIG. 1) and can be retrieved from the same for each printer device managed by the management computer 44 if the management computer 44 supports the host resources MIB item 37.

Having built the device list 186 in block 184 by accessing the host resources MIB item 37, execution passes to block 196 where the create associated index function 162 is called to create an associated index list 198. Beginning with the first device entry 188A in the device list 186, the create associated index function 162 calls the database access routine 150 of the database manager 148 (FIG. 4) which accesses the database 146 and searches for objects therein having an associated index value (e.g., input index value) which is associated with the device name value of the device name member 190A, the device index value of the device index member 192A, and/or the network address of the management computer 44 which manages the printer device defined by the first device entry 188A. If a database object is located, a first associated index entry 200A is created which comprises at least one type of device information describing a characteristic of the network manageable device which is distinct from the types of device information stored by the device entries 188. More preferably, each associated index entry 200 comprises a device reference member 202 for storing a reference to the device entry 188 which is associated with this associated index entry 200, an associated index member 204 for storing the value of the associated index (e.g., an input index value), and a next associated index entry member 206 which stores a reference to the next associated index entry in the associated index list 198. After having created all the associated index entries associated with the first device entry 188A (e.g., 200A and 200B), all the associated index entries (e.g., 200C and 200D) for the second device entry 188B in the device list 186 are next created by the same process as previously described. In this manner, each device entry 188, sequentially from the first device entry 188A to the last device entry (e.g., 188B), in the device list 186 will have associated therewith all associated index entries, as appropriate. The last associated index entry (e.g., 200D) in the associated index list 198 preferably stores a NULL value in the next associated index entry member (e.g., 206D) to indicate the end of the list. While the device index and the associated index values do not have to be sequential within their respective lists (e.g., 0, 1, 2, etc.), these index values are preferably in ascending order (e.g., 0,3,4,7, etc) from the first entry in the list to the last entry in the list. In addition, because all the associated index entries 200 for any given device entry 188 are preferably located before advancing to the next device entry 188 in the device list 186, all the associated index entries 200 for the same device entry 188 are preferably grouped together as shown in FIG. 13.

For example, suppose the management computer 44 is responsible for managing a first printer device having three input sub-units and a second printer device having two input sub-units. The device list 186 in this case would comprise two device entries, one for each of the printer devices. The first device entry 188A would have associated therewith three associated index entries, each storing the input index value for one of its printer input sub-units. Likewise, the second device entry 188B would have associated therewith two associated index entries, these two associated index entries following the three associated index entries for the first printer device.

Referring again to FIG. 12, execution next passes to block 208 where the avb length member 140A of the next instance list 174 is examined to determine if it is storing a NULL value. If it is, as would be the case with a GET request or the first execution of this block for a GETNEXT request, execution passes to block 210 where the implementation routine 124 calls the find associated index function 164. If the avb length member 140A of the next instance list is not storing a NULL value, execution passes to block 212 where the find associated index function 164 is also called. In both blocks 210 and 212, the implementation routine 113 passes into the find associated index function 164 the device index value stored in the avb length member 140A of the instance list 134A and the associated index value stored in the avb length member 140B of this list. Using these values, the find associated index function 164 searches the associated index list 198 from the first associated index entry (e.g., 200A) onward until it locates a matching associated index entry 200 having a value stored in its associated index member 204 which matches the value stored in the avb length member 140B of the instance list 134A. If a matching value is found, the device reference member 202 of this matching associated index entry is used to locate the corresponding device entry 188, whereat the value stored in the device index member 192 is compared to the value stored in the avb length member 140A of the instance list 134A. If this second match is found, execution passes to block 214 from block 210 or execution passes to block 216 if the previously executed block was block 212. Otherwise, the next associated index entry member 206 is utilized to step to the next associated index entry so that the above-described process is again repeated until a matching associated index entry (i.e., an entry which has both an associated index value and a device reference pointing to a device index value which match the values stored in the avb length members of the instance list 134A) is located or the end of the associated index list 198 is reached, in which case a NULL value is returned for the search.

Following execution of block 212, block 216 is next executed wherein the find next associated index function 166 is utilized to locate the next associated index entry based upon the next associated index entry member 206 of the associated index entry located in block 212. If the next associated index entry member 206 stores a NULL value or the execution of block 212 did not result in a match such that a NULL value was returned for the search, block 218 passes execution to block 220. Otherwise block 214 next is executed as shown in FIG. 12.

Following execution of block 210 or a no decision from block 218, block 214 is executed to retrieve the appropriate MIB item values from the database 146. More preferably, the exemplary For Loop and Switch Statement set forth below in Table 1 are executed for each attribute value block 136 of the of the MIB item value list 174, each attribute value block 136 being associated with a distinct MIB item for which a value is to be retrieved from the database 146.

TABLE 1

```
for ( next = mib_item_value_list; next != NULL; next =
next->avb_next_member)
{
    switch(next->avb_information_member->aib_identifier_member)
    {
        case prtInputIndex_ATTRIBUTE:
        {
            next->avb_length_member = data-
            base_access_routine(device_index,
            associated_index, network address, input index); break;
        }
        case prtInputType_ATTRIBUTE:
        {
            next->avb_length_member = data-
            base_access_routine(device_index,
            associated_index, network address, input type); break;
        }
        case prtInputDimUnit_ATTRIBUTE:
        {
            {
            next->avb_length_member = data-
            base_access_routine(device_index,
            associated_index, network address, input dimension
            unit); break;
            }
        }
    }
}
if (next_instance_list)
{
    next_instance_list->avb_length member = device_index;
    next_instance_list->avb_next_member->avb_length_member =
    associated_index;
}
```

As can be seen from Table 1, each aib identifier member 130 storing the value of last sub-OBJECT IDENTIFIER of the MIB items associated with the abstract MIB object (each MIB item being associated with a distinct attribute value block 136 as previously discussed) which is the subject of the SNMP request can be used pass the appropriate values to the database access routine 150 which retrieves the MIB item values from the database 146. Once the proper call to the database access routine 150 is located using the switch statement, the database access routine 150 retrieves the MIB item value from the database 146 preferably based upon network address of the management computer 44, the device index value retrieved from the device list 186, the associated index value retrieved from the associated index list 198, and an identifier for the specific MIB item the value of which is to be retrieved. This MIB item value is then placed into the empty avb length member 140 of the attribute value block 140 associated with this MIB item. In this manner, each of the attribute value blocks 136 of the MIB item value list 134B representing each of the MIB items of the MIB abstract object (e.g., 130) are traversed and the corresponding MIB item values for each are retrieved from the database 146.

After retrieving the MIB item values for each of the MIB items associated with MIB item value list 134B, the avb length members 140A and 140B of the next instance list 134C are updated in block 222 with the values of the device index and the associated index which were located in either block 210 or 216. If the SNMP request from the display computer 43 was an SNMP GETNEXT request, the SNMP agent module 104 will again call the GETNEXT function 126 in block 183, but on this execution pass in the values of the next instance list 134C which were stored in block 222 for the instance list 134A. Block 183 is preferably repeatedly executed by the SNMP agent module 104 for a GETNEXT request until a NULL value is reached in block 218 such that the MIB item values for each device instance represented by the device list 186 and the associated index list 198 are retrieved. After retrieving all the MIB item values for the SNMP request (i.e., a no decision in block 224 or a yes decision in block 218 are encountered), these MIB item values are returned to the display computer 43 by the SNMP agent module 104 and displayed on the display computer 43, as shown in block 220. If the SNMP request is a GET request, only values for a single device instance will be returned to the display computer 43, as shown by way of example in the SNMP GET results graphical display 102 of FIG. 8. If the SNMP request is a GETNEXT request, values for a plurality of device instances will be returned to the display computer 43, as shown by way of example in the SNMP GETNEXT results graphical display 74 of FIG. 6.

While the process 176 has been described with respect to two indexes, it is realized that the process can be adapted to accommodate MIB abstract objects having varying numbers of indexes. For example, the general entry item 226 (FIG. 2) of the printer general group item 32 defines only the device index hrDeviceIndex, and, therefore, the find device function 158 and the find next device function 160 are preferably provided in the main routine 152 to accommodate this situation. More particularly, these functions replace the find associated index function 164 and the find next associated index function 164 of blocks 210, 212, and 216. However, the find device function 158 and the find next device function 160 have the same functionality as the functions which they replace in the preferred process 176, which is to locate an index value within a linked list. More particularly, the find device function 158 and the find next device function 160 are adapted to locate a device index value in the device list 186.

Having shown and described the preferred embodiments of the present invention, further adaptation of the processes and apparatuses for managing network devices according to the present invention can be accomplished by appropriate modifications by one of ordinary skill in the art without departing from the scope of the present invention. A number of alternatives and modifications have been described herein and others will be apparent to those skilled in the art. For example, while the present invention has been described herein as comprising an agent module and an instrumentation module for flexibility of design, it is contemplated that these modules can be combined if desired. Likewise, while various aspects of the present invention have been described herein as applications, modules, routines, and functions, it is contemplated that each represents a set of computer instructions and, as such, can be rearranged and combined as desired. Accordingly, the scope of the present invention should be considered in terms of the following claims and is understood not to be limited to the details of the structures and methods shown and described in the specification and drawings.

What is claimed is:

1. A computer system for management of a plurality of network manageable devices comprising:
   a management computer;
   a plurality of network manageable devices which are in data communication with and managed by the management computer; and
   a display computer in data communication with the management computer and capable of displaying to a user of the display computer information relating to the network manageable devices that can be accessed by a management application, wherein the display computer is configured to generate an SNMP request, wherein the SNMP request comprises an object identifier for a MIB abstract object and an identifier associated with one of the network manageable devices capable of having management information to which access is desired, wherein the management application comprises a MIB compiler capable of generating at least one MIB output file from a MIB input file, wherein the MIB output file contains programming structures which can be used by the management application to determine the information it can access, and wherein the management computer is configured to retrieve MIB item values corresponding to the abstract MIB object and the other network manageable devices managed by the management computer, if the SNMP request is a GETNEXT request.

2. The system as recited in claim 1, wherein the plurality of network manageable devices comprise a plurality of printer devices.

3. A process for accessing management information associated with a plurality of network manageable devices, comprising the steps of:
   receiving at a management computer an SNMP request from a display computer, wherein the SNMP request comprises an object identifier for an MIB abstract object and an identifier associated with a network manageable device capable of having management information to which access is desired, wherein the MIB abstract object comprises a logical grouping of MIB items and is generated from an MIB compiler;
   initializing an instance list with a device index value for the network manageable device, wherein the instance list can be used to determine if a database includes MIB item values associated with the network manageable device;
   retrieving MIB item values corresponding to the abstract MIB object and the network manageable device from the database; and
   if the SNMP request is a GETNEXT request, retrieving MIB item values corresponding to the abstract MIB object and any other network manageable device managed by the management computer.

4. The process as recited in claim 3, wherein the network manageable devices comprise a plurality of printer devices.

5. The process as recited in claim 3, wherein the steps are stored as instructions on a computer-readable medium.

6. A computer system for management of a plurality of network manageable devices comprising:
   a management computer;
   a plurality of network manageable devices which are in data communication with and managed by the management computer; and
   a display computer in data communication with the management computer and capable of displaying to a user of the display computer information relating to the network manageable devices that can be accessed by a management application, wherein the display computer is configured to generate an SNMP request, wherein the SNMP request comprises an object identifier for a MIB abstract object, wherein the management application comprises a MIB compiler capable of generating at least one MIB output file from a MIB input file, wherein the MIB output file contains programming structures which can be used by the management application to determine the information it can access, and wherein the management computer is configured to retrieve MIB item values corresponding to the abstract MIB object and to initialize an instance list with a device index value for a network manageable device, wherein the instance list can be used to determine if a database includes MIB item values associated with the network manageable device.

7. The system as recited in claim 6, wherein the plurality of network manageable devices comprise a plurality of printer devices.

* * * * *